United States Patent
Jiang et al.

(10) Patent No.: US 9,208,544 B2
(45) Date of Patent: Dec. 8, 2015

(54) IMAGE PROCESSING APPARATUS AND IMAGE FINE-TUNING METHOD THEREOF

(71) Applicant: Novatek Microelectronics Corp., Hsinchu (TW)

(72) Inventors: Jian-De Jiang, ShanXi (CN); Jian-Hua Liang, ShanXi (CN); Yuan-Jia Du, Shandong (CN); Chun Wang, Shanghai (CN); Chun-Wei Chen, Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 39 days.

(21) Appl. No.: 14/140,552

(22) Filed: Dec. 26, 2013

(65) Prior Publication Data

US 2015/0125088 A1 May 7, 2015

(30) Foreign Application Priority Data

Nov. 6, 2013 (CN) ............................ 2013 1 0544221

(51) Int. Cl.
*G06K 9/40* (2006.01)
*G06T 5/00* (2006.01)

(52) U.S. Cl.
CPC ....... *G06T 5/003* (2013.01); *G06T 2207/10004* (2013.01); *G06T 2207/20024* (2013.01); *G06T 2207/20172* (2013.01)

(58) Field of Classification Search
None
See application file for complete search history.

(56) References Cited

U.S. PATENT DOCUMENTS

| 6,285,798 | B1 * | 9/2001 | Lee ................................ 382/260 |
| 7,894,684 | B2 * | 2/2011 | Monobe et al. ............... 382/254 |
| 8,503,828 | B2 * | 8/2013 | Kondo et al. .................. 382/299 |
| 2005/0094890 | A1 * | 5/2005 | Wang ............................ 382/266 |
| 2010/0119176 | A1 * | 5/2010 | Ichihashi et al. .............. 382/300 |
| 2010/0135395 | A1 * | 6/2010 | Servais et al. ............ 375/240.16 |
| 2011/0037894 | A1 * | 2/2011 | Sbaiz ............................ 348/441 |
| 2011/0221966 | A1 * | 9/2011 | Hsieh et al. ................... 348/665 |
| 2012/0086850 | A1 * | 4/2012 | Irani et al. ..................... 348/441 |

FOREIGN PATENT DOCUMENTS

TW M403069 5/2011

OTHER PUBLICATIONS

Glasner, D.; Bagon, S.; Irani, M., "Super-resolution from a single image," Computer Vision, 2009 IEEE 12th International Conference on , vol., No., pp. 349,356, Sep. 29, 2009-Oct. 2, 2009.*
"Office Action of Taiwan Counterpart Application", issued on Oct. 8, 2015, p. 1-p. 7.

* cited by examiner

*Primary Examiner* — Andrae S Allison
(74) *Attorney, Agent, or Firm* — Jianq Chyun IP Office

(57) ABSTRACT

An image processing apparatus and an image fine-tuning method are provided. The image processing apparatus includes a high-pass filter, a block comparator, an image data reconstructor, and a calculator. The high-pass filter receives a first image to generate a filtered image. The block comparator receives an input image and the first image to generate a block comparison result. The image data reconstructor receives the filtered image and the block comparison result to generate image reconstruction data. The calculator receives the input image and the image reconstruction data to generate an output image.

12 Claims, 3 Drawing Sheets

IMAGE PROCESSING APPARATUS AND IMAGE FINE-TUNING METHOD THEREOF

CROSS-REFERENCE TO RELATED APPLICATION

This application claims the priority benefit of China application serial no. 201310544221.0, filed on Nov. 6, 2013. The entirety of the above-mentioned patent application is hereby incorporated by reference herein and made a part of this specification.

BACKGROUND OF THE INVENTION

1. Field of the Invention

The invention relates to an image processing apparatus and an image fine-tuning method thereof and more particularly relates to an image processing apparatus for improving resolution and an image fine-tuning method thereof.

2. Description of Related Art

With the increasing popularity of electronic products, image processing apparatuses that fine-tune images for electronic devices has become the focus of attention of the designers. To cope with the increasing image resolution outputted by display devices, the user needs an electronic apparatus for fine-tuning low-resolution images.

In the related art, methods for fine-tuning low-resolution images includes a Luma transient improvement method and a database-based super-resolution method. However, the Luma transient improvement method widens image edges. Such a problem may be avoided by using the database-based super-resolution method. However, since it is impossible to include all input image types in the image database, some images can not be fine-tuned. Therefore, how to avoid widening image edges and solve the problem of limited input image types becomes an important issue in this field.

SUMMARY OF THE INVENTION

The invention provides an image processing apparatus and an image fine-tuning method thereof for performing an image fine-tuning operation on an image, so as to meet a resolution requirement of a high resolution display device.

The image processing apparatus of the invention includes a high-pass filter, a block comparator, an image data reconstructor, and a calculator. The high-pass filter receives an input image to generate a filtered image. The block comparator receives the input image and a first image and performs block comparison on the input image and the first image to generate a block comparison result, wherein the first image is generated based on the input image. The image data reconstructor is coupled to the high-pass filter and the block comparator, and generates image reconstruction data based on the block comparison result and the filtered image. The calculator is coupled to the image data reconstructor and performs an operation on the image reconstruction data and the input image to generate an output image.

The image fine-tuning method of the invention is adapted for the image processing apparatus. The image fine-tuning method includes: receiving an input image to generate a filtered image; performing a comparing operation between blocks of the input image and a first image to generate a block comparison result; generating image reconstruction data based on the block comparison result and the filtered image; and performing an operation on the image reconstruction data and the input image to generate an output image.

Based on the above, the invention utilizes high-pass filtering to generate the filtered image, uses the block comparator to compare the input image and the first image to generate the block comparison result, uses the image data reconstructor to generate the image reconstruction data, and performs an operation on the image reconstruction data and the input image, so as to obtain the output image. The aforementioned apparatus and method improve the resolution of the input image without restriction on the type of the input image, and furthermore solve the problem of widened image edges, which results from the improvement of image resolution.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
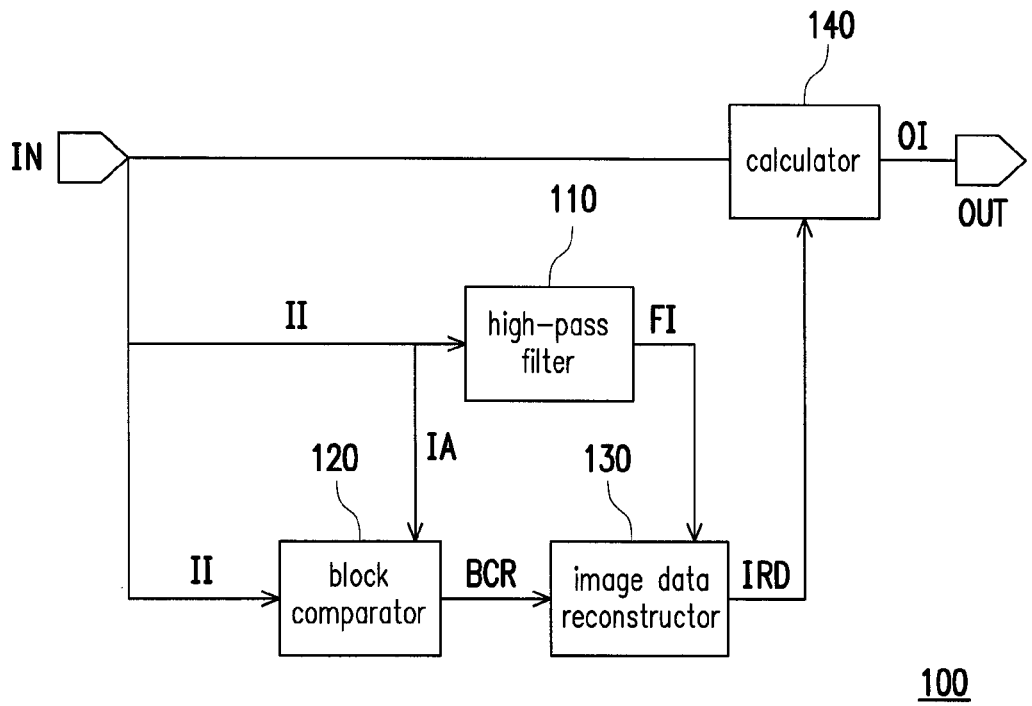
FIG. 1 is a schematic diagram of an image processing apparatus 100 in an embodiment of the invention.

Referring to FIG. 1, FIG. 1 is a schematic diagram of an image processing apparatus 100 in an embodiment of the invention. The image processing apparatus 100 has an image input end IN and an image output end OUT, wherein the image input end IN receives an input image II and the image output end OUT generates an output image CM. The image processing apparatus 100 further includes a high-pass filter 110, a block comparator 120, an image data reconstructor 130, and a calculator 140. The high-pass filter 110 is coupled to the image input end IN to receive the input image II and performs a high-pass filtering operation on the received input image II, so as to generate a filtered image FI. Specifically, the high-pass filter 110 may be a digital filter and used for filtering data of a low frequency component in the input image II. That is to say, the high-pass filter 110 may performs image sharpening on the input image II.

The block comparator 120 is coupled to the image input end IN to receive the input image II. In addition, the block comparator 120 receives a first image IA generated based on the input image II. In this embodiment, the first image IA is equivalent to the input image II. The block comparator 120 may perform a block comparing operation on the input image II and the first image IA and thereby generate a block comparison result BCR. The block comparator 120 is further coupled to the image data reconstructor 130, and the block comparator 120 transmits the generated block comparison result BCR to the image data reconstructor 130.

More specifically, the block comparator 120 may acquire a block of the first image IA for performing an image data comparing operation with a block of the input image II. A size of the block (referred to as "reference block" hereinafter) acquired from the first image IA may be smaller than a size of the block (referred to as "target block" hereinafter) of the input image II that is compared. If a situation that the reference block is the same as the target block occurs, coordinates of a representative point in the target block are recorded so as to generate the block comparison result BCR, wherein the representative point may be a center point of the target block or a point set at any position.

The image data reconstructor 130 is further coupled to the high-pass filter 110. The image data reconstructor 130 receives the block comparison result BCR from the block comparator 120 and the filtered image FI from the high-pass filter 110. Moreover, the image data reconstructor 130 may generate image reconstruction data IRD based on the block comparison result BCR and the filtered image FI.

Regarding details of embodiment of the image data reconstructor 130, the image data reconstructor 130 may find a plurality of corresponding pixels in the filtered image FI according to a portion of a plurality of vectors in the block comparison result BCR. The image data reconstructor 130 obtains a sum of values of the pixels by an addition operation and then calculates an average value thereof, so as to obtain the image reconstruction data IRD.

It is worth mentioning that an image reconstruction method of the image data reconstructor 130 may be performed by using overlapped block motion compensation (OBMC).

The aforementioned addition operation may be a weight addition operation. The image data reconstructor 130 may weight values of points in the filtered image FI, to which different vectors point, according to different weights and add the weighted values to calculate an average value thereof so as to generate the image reconstruction data IRD.

The calculator 140 is coupled to the image input end IN, the image data reconstructor 130, and the image output end OUT. The calculator 140 receives the input image II and the image reconstruction data IRD and performs an arithmetic operation on the input image II and the image reconstruction data IRD, so as to generate the output image OI.

Figure 2:
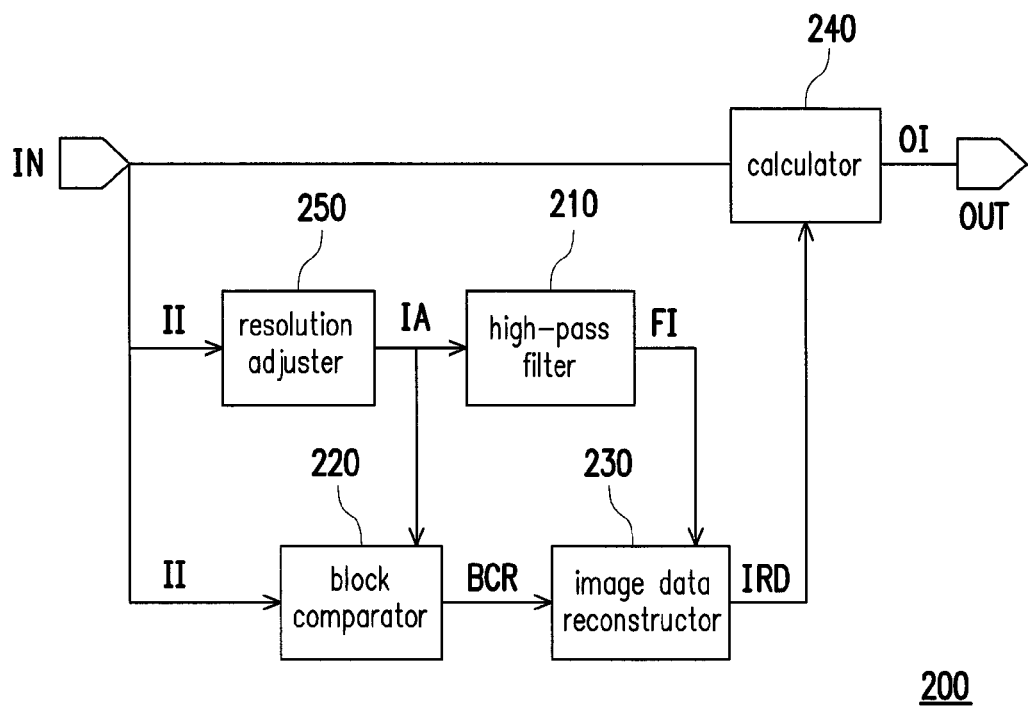
FIG. 2 is a schematic diagram of the image processing apparatus 100 in another embodiment of the invention.

Referring to FIG. 2 and FIG. 1, FIG. 2 is a schematic diagram of an image processing apparatus 200 in another embodiment of the invention. A difference between the image processing apparatus 200 of FIG. 2 and the image processing apparatus 100 of FIG. 1 is that the image processing apparatus 200 of FIG. 2 further includes a resolution adjuster 250, wherein the resolution adjuster 250 is coupled to a coupling path of the image input end IN and a high-pass filter 210. In addition, a block comparator 220 is coupled to the resolution adjuster 250 to receive a first image IA generated by the resolution adjuster 250.

In this embodiment, the resolution adjuster 250 may be used to adjust the resolution of the input image II. In other words, the resolution adjuster 250 may be utilized to reduce the resolution of the input image II to generate the first image IA. Certainly, the resolution adjuster 250 may not adjust the resolution of the input image II. That is to say, an adjustment parameter thereof may be equal to 1 (the situation that the input image II and the first image IA are the same).

The resolution adjuster 250 receives the input image II and outputs the first image IA to the high-pass filter 210 and the block comparator 220. Accordingly, the block comparator 220 performs the block comparing operation with the first image IA that has lower resolution and the input image II that has higher resolution to generate a block comparison result BCR. The block comparing operation performed by the block comparator 220 may also be reduced to accelerate the block comparison.

Furthermore, in this embodiment, the high-pass filter 110 may be changed to receive the first image IA that has lower resolution to perform the high-pass filtering operation. It should be noted that, in a condition that the high-pass filter 110 is a digital filter, the number of taps and the number of filtering coefficients of the high-pass filter 110 may be set in accordance with a state of the received first image IA. For example, the designer may select preset number of the taps and filtering coefficients according to the actual applications of the image processing apparatus 200 and the designer's requirements to design the high-pass filter 110.

Figure 3:
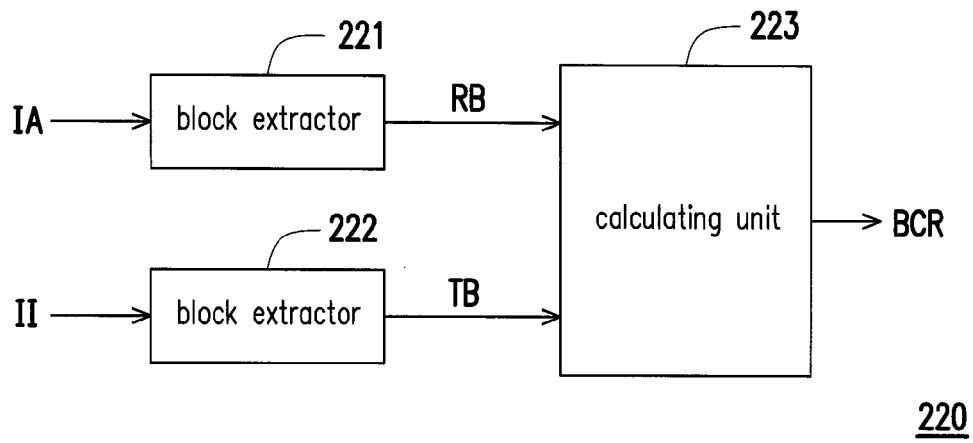
FIG. 3 is a schematic diagram of a block comparator 220 in an embodiment of the invention.

Below please refer to FIG. 3. FIG. 3 is a schematic diagram of the block comparator 220 in this embodiment of the invention. The block comparator 220 includes a block extractor 221, a block extractor 222, and a calculating unit 223. The block extractor 221 receives the first image IA and extracts a reference block RB from the first image IA, and the block extractor 222 receives the input image II and extracts a target block TB from the input image II. The calculating unit 223 is coupled to the block extractor 221 and the block extractor 222 to respectively receive the reference block RB and the target block TB. The calculating unit 223 utilizes the reference block RB to perform a block comparing operation on the target block TB so as to generate the block comparison result. Herein, a size of the reference block RB is not larger than a size of the target block TB.

More specifically, when the calculating unit 223 performs block comparison between the reference block RB and the target block TB, the calculating unit 223 may divide the target block TB into a plurality of sub-blocks according to dimensions the reference block RB, wherein the sub-blocks may partially overlap each other. The calculating unit 223 respectively compares the reference block RB with each sub-block of the target block TB and records coordinates of a reference point of the corresponding sub-block when the similarity between data of the reference block RB and the sub-block under comparison is high enough, so as to output the block comparison result BCR in a form of generating a vector.

It should be noted that, when comparing the reference block RB with each sub-block, the calculating unit 223 may perform comparison for the reference block RB sequentially in a manner of row scanning or column scanning according to an order of the sub-blocks.

Figure 4:
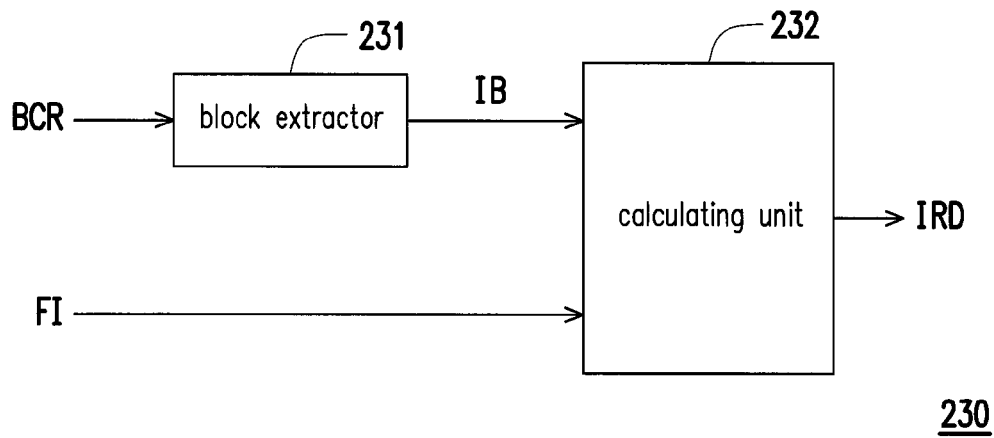
FIG. 4 is a schematic diagram of an image data reconstructor 230 in an embodiment of the invention.

Please refer to FIG. 4. FIG. 4 is a schematic diagram of an image data reconstructor 230 in this embodiment of the invention. The image data reconstructor 230 includes a block extractor 231 and a calculating unit 232. The block extractor 231 receives the block comparison result BCR and extracts a block to generate an information block IB, and the calculating unit 232 is coupled to the block extractor 231 to receive the information block IB. Furthermore, the calculating unit 232 also receives the filtered image FI and the information block IB for performing image data reconstruction.

More specifically, when the calculating unit 232 receives the information block IB and the filtered image FI, the calculating unit 232 finds a plurality of points in the filtered image FI, to which a plurality of vectors in the information block IB correspond, and then obtains a sum of values of the points and calculates an average value thereof to obtain the image reconstruction data IRD of a center point of the information block IB.

In the operation of calculating the sum of the values of the pixels, weighted addition may also be used in this embodiment of the invention, wherein a weight value may be determined by the vectors in the information block IB, to which the pixels in the filtered image FI correspond.

Figure 5:
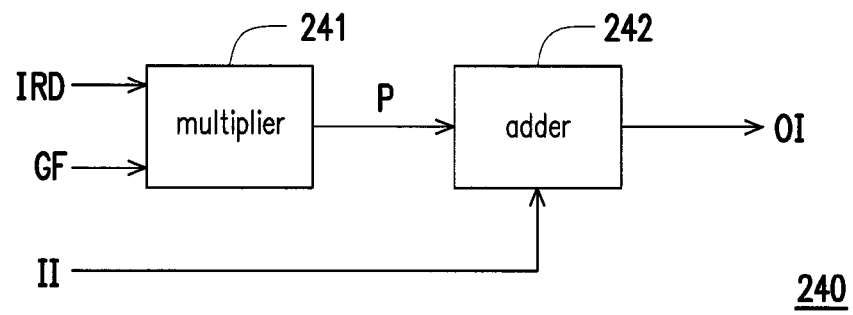
FIG. 5 is a schematic diagram of a calculator 240 in an embodiment of the invention.

Please refer to FIG. 5. FIG. 5 is a schematic diagram of a calculator 240 in this embodiment of the invention. The calculator 240 includes a multiplier 241 and an adder 242. The multiplier 241 receives the image reconstruction data IRD and a gain factor GF to output a product P. The adder 242 is coupled to the multiplier 241 to receive the product P so as to obtain the output image OI.

More specifically, the multiplier 241 receives the image reconstruction data IRD and the gain factor GF and multiplies the image reconstruction data IRD by the gain factor GF to obtain the product P, and then transmits the product P to the adder 242. After receiving the product P and the input image II, the adder 242 adds the product P and the input image II to obtain the output image OI. The aforementioned gain factor GF may be a preset value, which may be set by the engineering staff according to the actual use.

Figure 6:
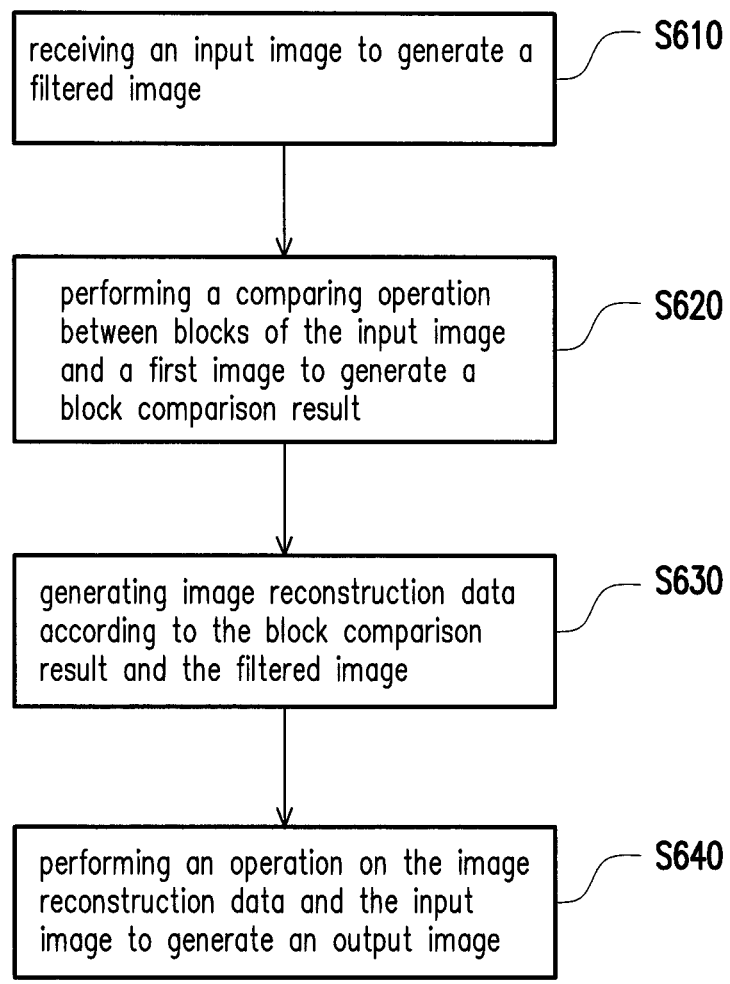
FIG. 6 is a flowchart showing an image fine-tuning method in an embodiment of the invention.

Please refer to FIG. 6. FIG. 6 is a flowchart showing an image fine-tuning method in an embodiment of the invention. The image fine-tuning method includes the following: in Step S610, receiving an input image to generate a filtered image; in Step S620, performing a comparing operation between blocks of the input image and a first image to generate a block comparison result; in Step S630, generating image reconstruction data according to the block comparison result and the filtered image; and in Step S640, performing an operation on the image reconstruction data and the input image to generate an output image.

To sum up, the invention improves the resolution of the input image by means of high-pass filtering, block comparison, and image reconstruction without restriction on the type of the input image, and at the same time solves the problem of widened image edges resulting from the improvement of image resolution.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. An image processing apparatus, comprising:
 a high-pass filter performing filtering on an input image to generate a filtered image;
 a block comparator receiving the input image and a first image and performing a comparing operation between blocks of the input image and the first image to generate a block comparison result;
 an image data reconstructor coupled to the high-pass filter and the block comparator and the image data reconstructor generating image reconstruction data based on the block comparison result and the filtered image, comprises:
  a block extractor coupled to the block comparator and extracting a portion of the block comparison result to generate an information block; and
  a calculating unit coupled to the block extractor and finding a plurality of pixels in the filtered image that correspond to a plurality of vectors in the information block according to the plurality of vectors, wherein the calculating unit performs an addition operation on values of the plurality of pixels and calculates an average value according to a result of the addition operation, wherein the image reconstruction data is generated based on the average value; and
 a calculator coupled to the image data reconstructor and the calculator performing an operation on the image reconstruction data and the input image to generate an output image,
 wherein the first image is generated according to the input image.

2. The image processing apparatus according to claim 1, further comprising:
 a resolution adjuster coupled to a path by which the high-pass filter receives the input image, wherein the resolution adjuster receives the input image and adjusts a resolution of the input image according to an adjustment parameter to generate the first image.

3. The image processing apparatus according to claim 1, wherein the first image and the input image are the same.

4. The image processing apparatus according to claim 1, wherein the high-pass filter is a digital filter comprising a plurality of taps and a plurality of filtering coefficients.

5. The image processing apparatus according to claim 1, wherein the block comparator comprises:
 a first block extractor performing image extraction on the first image to generate a reference block;
 a second block extractor performing image extraction on the input image to generate a target block, wherein a size of the reference block is smaller than a size of the target block; and
 a calculating unit coupled to the first block extractor and the second block extractor to perform a block comparison on the target block and the reference block to generate the block comparison result.

6. The image processing apparatus according to claim 1, wherein the addition operation is a weight addition operation.

7. The image processing apparatus according to claim 1, wherein the calculator multiplies the image reconstruction data by a gain factor to obtain a product, and adds the product and the input image to obtain the output image.

8. The image processing apparatus according to claim 7, wherein the calculator comprises:
 a multiplier receiving the image reconstruction data and the gain factor to generate the product; and
 an adder coupled to the multiplier and performing an addition operation on the product and the input image to generate the output image.

9. An image fine-tuning method, comprising:
 receiving an input image to generate a filtered image;
 performing a comparing operation between blocks of the input image and a first image to generate a block comparison result;
 generating image reconstruction data according to the block comparison result and the filtered image, comprises:
  extracting a portion of the block comparison result to generate an information block;
  finding a plurality of pixels in the filtered image that correspond to a plurality of vectors in the information block according to the plurality of vectors; and
  performing an addition operation on values of the plurality of pixels and calculates an average value according to a result of the addition operation, wherein the image reconstruction data is generated based on the average value; and
 performing an operation on the image reconstruction data and the input image to generate an output image.

10. The image fine-tuning method according to claim 9, further comprising:

receiving the input image and adjusting a resolution of the input image according to an adjustment parameter to generate the first image.

11. The image fine-tuning method according to claim 9, wherein the step of performing the comparing operation between the blocks of the input image and the first image to generate the block comparison result comprises:

extracting a reference block on the first image and extracting a target block on the input image, wherein a size of the reference block is smaller than a size of the target block; and performing a block comparison on the reference block and the target block to generate the block comparison result.

12. The image fine-tuning method according to claim 9, wherein the step of performing the operation on the image reconstruction data and the input image to generate the output image comprises:

multiplying the image reconstruction data by a gain factor to obtain a product, and adding the product and the input image to obtain the output image.

* * * * *